United States Patent
Vigilant et al.

(10) Patent No.: US 8,402,287 B2
(45) Date of Patent: Mar. 19, 2013

(54) PROTECTION AGAINST SIDE CHANNEL ATTACKS

(75) Inventors: David Vigilant, Meudon (FR); Guillaume Fumaroli, Meudon (FR)

(73) Assignee: Gemalto SA, Meudon (FR)

( * ) Notice: Subject to any disclaimer, the term of this patent is extended or adjusted under 35 U.S.C. 154(b) by 1131 days.

(21) Appl. No.: 12/282,210

(22) PCT Filed: Mar. 23, 2007

(86) PCT No.: PCT/IB2007/000728
§ 371 (c)(1), (2), (4) Date: Sep. 9, 2008

(87) PCT Pub. No.: WO2007/116262
PCT Pub. Date: Oct. 18, 2007

(65) Prior Publication Data
US 2009/0092245 A1    Apr. 9, 2009

(51) Int. Cl.
*G06F 21/00* (2006.01)

(52) U.S. Cl. .................... 713/194; 380/28

(58) Field of Classification Search .......... None
See application file for complete search history.

(56) References Cited

U.S. PATENT DOCUMENTS

| | | | |
|---|---|---|---|
| 6,738,478 B1 * | 5/2004 | Vanstone et al. | 380/28 |
| 2004/0267859 A1 | 12/2004 | Fischer et al. | |
| 2005/0084098 A1 | 4/2005 | Brickell | |
| 2005/0152541 A1 * | 7/2005 | Takenaka et al. | 380/28 |
| 2006/0093137 A1 * | 5/2006 | Izu et al. | 380/30 |
| 2007/0150530 A1 * | 6/2007 | Mevergnies et al. | 708/7 |
| 2007/0177721 A1 * | 8/2007 | Itoh et al. | 380/28 |

FOREIGN PATENT DOCUMENTS

| | | |
|---|---|---|
| WO | WO2004070497 A | 8/2004 |
| WO | WO2005008955 A1 | 1/2005 |

OTHER PUBLICATIONS

Joye, M et al, "The Montgomery Powering Ladder", Cryptographic Hardware and Embedded Systems International Workshop, Aug. 13, 2002, pp. 291-302, XP001160513, Whole document.

Trichina E et al, Implementation of Elliptic Curve Cryptography with Built in Counter Measures Against Side Channel Attacks:, Cryptographic Hardware and Embedded Systems International Workshop, Aug. 13, 2002, pp. 98-113, XP001160524, Chapter 3.2 A multiplicative mask.

Sung-Ming, Yen et al, Improvement on Ha-Moon Randomized Exponentiation Algorithm, Springer Verlag Berlin Heidelberg, 2005, pp. 154-167, XP019010693, Abstract.

B. S. Kaliski Jr., et al..(Eds), The Montgomery Powering Ladder, CHES 2002, LNCS 2523, pp. 291-302, 2003. (c) Springer-Verlag Berlin Heidelberg 2003.

* cited by examiner

*Primary Examiner* — Gilberto Barron, Jr.
*Assistant Examiner* — Shaun Gregory
(74) *Attorney, Agent, or Firm* — The Jansson Firm; Pehr B. Jansson

(57) ABSTRACT

The invention relates to a cryptographic mechanism and to a cryptographic device incorporating such cryptographic mechanism. The cryptographic mechanism offers a better resistance to side channel attacks than that of known cryptographic mechanisms by incorporating a new type of masking mechanism.

19 Claims, 7 Drawing Sheets

---

A cryptographic mechanism according to the invention

INPUT: X, D = $\{d_0, d_1, \ldots d_{n-1}\}_2$

OUTPUT: $X^D$ 1. generate a random number R having an inverse (denoted $R^{-1}$)
2. $VAR_0 \leftarrow R$, $VAR_1 \leftarrow X*R$, $MSK_n \leftarrow R^{-1}$
3. For i from n-1 down to 0 do {MUL<sub>i</sub>}   $VAR_{1-d_i} \leftarrow VAR_{1-d_i} * VAR_{d_i}$ {SQ<sub>i</sub>}    $VAR_{d_i} \leftarrow VAR_{d_i} * VAR_{d_i}$ {SQ_RD<sub>i</sub>}  $MSK_i \leftarrow MSK_{i+1} * MSK_{i+1}$ 4. Return $VAR_0 * MSK_0$ Typical modular exponentiation algorithm INPUT: X, D = {$d_0, d_1, \ldots d_{n-1}$}$_2$, N OUTPUT: $X^D$ mod N 1. A ← 1
2. For k from n-1 down to 0 do
   i.   A ← $A^2$ mod N
   ii.  If $d_k$ = 1 then A ← A * X mod N
3. Return A

Figure 1

Balanced modular exponentiation algorithm

INPUT: X, D = {$d_0, d_1, \ldots d_{n-1}$}$_2$, N

OUTPUT: $X^D$ mod N

1. A ← 1
2. For k from n-1 down to 0 do
      i.     A ← $A^2$ mod N
      ii.    If $d_k$ = 1 then A ← A * X mod N
      iii.   Else B ← A * X mod N
3. Return A

Figure 2

Joye & Al. modular exponentiation algorithm

INPUT: $X, D = \{d_0, d_1, \ldots d_{n-1}\}_2, N$

OUTPUT: $X^D \bmod N$

1. $a_0 \leftarrow 1, a_1 \leftarrow X$
2. For k from n-1 down to 0 do
   i.    $a_{1-dk} \leftarrow a_{1-dk} * a_{dk} \bmod N$
   ii.   $a_{dk} \leftarrow (a_{dk})^2 \bmod N$
3. Return $a_0$

Figure 3

A possible masking mechanism for modular exponentiation

INPUT: $X, D = \{d_0, d_1, \ldots d_{n-1}\}_2, N$

OUTPUT: $X^D \bmod N$ 1. generate a random number R having an inverse (denoted $R^{-1}$)
2. $a_0 \leftarrow 1, a_1 \leftarrow X*R$
3. For k from n-1 down to 0 do
    i.   $a_{1-d_k} \leftarrow a_{1-d_k} * a_{d_k} \bmod N$
    ii.  $a_{d_k} \leftarrow (a_{d_k})^2 \bmod N$
4. $b_0 \leftarrow 1, b_1 \leftarrow R^{-1}$
5. For k from n-1 down to 0 do
    i.   $b_{1-d_k} \leftarrow b_{1-d_k} * b_{d_k} \bmod N$
    ii.  $b_{d_k} \leftarrow (b_{d_k})^2 \bmod N$
6. Return $a_0*b_0$

Figure 4

A cryptographic mechanism according to the invention

INPUT: X, D = $\{d_0, d_1, \ldots d_{n-1}\}_2$

OUTPUT: $X^D$ 1. generate a random number R having an inverse (denoted $R^{-1}$)
2. $VAR_0 \leftarrow R$, $VAR_1 \leftarrow X*R$, $MSK_n \leftarrow R^{-1}$
3. For i from n-1 down to 0 do {$MUL_i$}    $VAR_{1-d_i} \leftarrow VAR_{1-d_i} * VAR_{d_i}$ {$SQ_i$}    $VAR_{d_i} \leftarrow VAR_{d_i} * VAR_{d_i}$ {$SQ\_RD_i$}    $MSK_i \leftarrow MSK_{i+1} * MSK_{i+1}$ 4. Return $VAR_0 * MSK_0$

Figure 5

A variant of the cryptographic mechanism according to the invention

INPUT: X, D = {$d_0, d_1, \ldots d_{n-1}$}$_2$

OUTPUT: $X^D$ 1. generate a random number R having an inverse (denoted $R^{-1}$)
2. $VAR_0 \leftarrow R$, $VAR_1 \leftarrow X*R$, $MSK_n \leftarrow R^{-1}$
3. For i from n-1 down to 0 do {$MUL_i$}    $VAR_{1-d_i} \leftarrow VAR_{1-d_i} * VAR_{d_i}$ {$SQ_i$}    $VAR_{d_i} \leftarrow VAR_{d_i} * VAR_{d_i}$ 4. For i from n-1 down to 0 do {$SQ\_RD_i$}    $MSK_i \leftarrow MSK_{i+1} * MSK_{i+1}$ 5. Return $VAR_0 * MSK_0$

Figure 6

Another variant of the cryptographic mechanism according to the invention

INPUT: $X, D = \{d_0, d_1, \ldots d_{n-1}\}_2$

OUTPUT: $X^D$ 1. generate a random number R having an inverse (denoted $R^{-1}$)
2. $VAR_0 \leftarrow R$, $VAR_1 \leftarrow X*R$, $MSK_n \leftarrow R^{-1}$
3. parallel execution of the following two threads:

| Thread 3a | Thread 3b |
|---|---|
| For i from n-1 down to 0 do | For i from n-1 down to 0 do |
| {MUL$_i$} $VAR_{1-di} \leftarrow VAR_{1-di} * VAR_{di}$ | {SQ_RD$_i$}    $MSK_i \leftarrow MSK_{i+1} * MSK_{i+1}$ |
| {SQ$_i$}  $VAR_{di} \leftarrow VAR_{di} * VAR_{di}$ | |

4. Return $VAR_0 * MSK_0$

Figure 7

PROTECTION AGAINST SIDE CHANNEL ATTACKS

BACKGROUND OF THE INVENTION

1. Field of the Invention

The invention relates to methods for protecting cryptographic devices against side channel attacks, and to cryptographic devices embedding such methods.

2. Description of the Related Art

As known in the art, cryptographic devices are devices implementing cryptographic mechanisms. Examples of cryptographic devices include smart cards, USB keys, dongles, Personal Digital Assistants (a.k.a PDAs), mobile phones, personal computers (a.k.a PCs), etc. Such cryptographic devices are used in particular for securing a user's electronic transactions. The expression "electronic transaction" is to be taken in its broadest meaning. I.E. it is not limited to financial transaction but also contain any Internet transaction, any transaction occurring through a telecommunication network etc. Securing electronic transactions may comprise the cryptographic mechanisms of digitally signing electronic documents, decrypting electronic documents, negotiating session keys with a third party and/or authenticating a user. The above four cryptographic mechanisms are well known in the art. They are not limitative (other cryptographic mechanisms exist), and not mandatory (for example a cryptographic device does not necessarily embed a digital signature mechanism).

Cryptographic mechanisms have an input and an output. For example, an encryption mechanism may have an input consisting of a plaintext and an output consisting of a ciphertext. When first cryptographic devices were designed, people had the feeling that the only attacks possible on their cryptographic mechanisms consisted in attacking the input and output. However, it turned out that cryptographic devices are also susceptible to so-called "side channel attacks". Side channel attacks rely on the fact that a cryptographic device has input and output means other than the legitimate input and output means. For example use of illegitimate, input means may comprise altering cryptographic operations by heating the cryptographic device, by modifying its clock (e.g. speeding up above the recommended limit), by putting it under UV light, X-Ray, or ultrasonic waves, by shaking it or otherwise mechanically acting on it, etc. Such alteration can be carefully designed (for example a glitch can be introduced at the exact moment that a counter is about to be decremented) or can be random (for example the aim might simply be to induce a random fault and analyze the consequence of the fault, which may leak sensitive information). Use of illegitimate output means may comprise analyzing the power consumption of the cryptographic device (e.g. an electronic component requires more electric power to perform a complex operation such as "square and multiply" than it does for a simple operation such as "square only"), analyzing the electromagnetic field created by the cryptographic device, analyzing the sounds emitted by the cryptographic device, etc. Well-known side channel attacks include Simple Power Analysis (SPA), Differential Power Analysis (DPA) or Differential Fault Analysis (DFA).

Cryptographic mechanisms consist of mechanisms involving at least a secret D which is supposed to be stored securely in a cryptographic device. D should not be leaked outside the cryptographic device through any attack. In a manner known in the art, D can be represented in the form of an n-bit number $(d_0, d_1, \ldots d_{n-1})_2$, where $d_i$ is a bit (for each integer i between 0 and n−1). In the rest of the document, the exponent D will be denoted $\{d_0, d_1, \ldots d_{n-1}\}_2$ instead of $(d_0, d_1, \ldots d_{n-1})_2$ as is usually the case in mathematics in order not to introduce any ambiguity with the reference signs placed in the claims between parentheses as per the European Patent Convention.

In abstract algebra, which is a branch of mathematics, a monoid $(M, \perp)$ is defined as an algebraic set, the set being closed under an associative binary operation $\perp$, the set having an identity element. Contrary to a group, in a monoid every element does not necessarily have an inverse. The operation $\perp$ can also be represented with other symbols. For example, the operation $\perp$ can be represented as an additive operation (symbol +), as a multiplicative operation (symbol *), etc. This representation is purely formal and does not affect the properties of the monoid. In the rest of the application, monoids will be represented with the multiplicative operation *, and will be denoted $\{M, *\}$ instead of $(M, *)$ in order not to introduce any ambiguity with the reference signs placed in the claims between parentheses as per the European Patent Convention.

Monoids are widespread in cryptography. The most widespread monoids in the field of cryptography are large monoids having many invertible elements, e.g. $2^{80}$ invertible elements. For example, with the RSA algorithm, almost all elements are invertible (the exceptions being in particular the multiples of p and q). M* denotes the set containing all invertible elements of the set M of the monoid $\{M, *\}$.

In the rest of the application, all monoids are abelian monoids, that is monoids in which all elements commute.

Cryptographic mechanisms particularly sensitive to side channel attacks comprise mechanisms in which for each $d_j$ equal to a certain value v (i.e. v=0 or v=1), the mechanism calculates $X^2$ and $Y*Z$ (where X, Y and Z are three elements of a monoid $\{M, *\}$), and for each $d_j$ equal to the other value ($d_j=1-v$), the mechanism calculates $T^2$ (where T is an element of the monoid $\{M, *\}$). Examples of such mechanisms include RSA modular exponentiation.

$X^2$ is called a squaring operation and stands for $X*X$.

$X^n$ stands for $X*X* \ldots *X$ where X appears n times.

Note: in a monoid with an additive notation, $X^2$ would be written 2X and would stand for X+X. Similarly, $X^n$ would be written nX and would stand for $X+X+ \ldots +X$ where X appears n times.

$Y*Z$ is called a multiplication operation.

The invention improves the resistance of above-mentioned particularly sensitive cryptographic mechanisms to side channel attacks. Examples of such mechanisms include elliptic curve point multiplications, and modular exponentiations used when performing an RSA operation or a Diffie Hellman key establishment. The invention also limits the amount of processing required for securing the cryptographic mechanisms. It does so by introducing a particular type of masking mechanism (also known as blinding mechanism).

BRIEF DESCRIPTION OF THE DRAWINGS

The invention and its advantages will be explained more in details in the following specification referring to the appended drawings, in which:

FIG. 1 represents a typical cryptographic mechanism without any protections against side channel attacks.

FIG. 2 represents a cryptographic mechanism with a first level of protection against side channel attacks, known in the art as the "balanced modular exponentiation algorithm".

FIG. 3 represents a cryptographic mechanism with a second level of protection against side channel attacks, known in the art as "Joye & Al. modular exponentiation algorithm".

FIG. 4 represents a possible masking mechanism for modular exponentiation.

FIG. 5 represents a preferred cryptographic mechanism according to the invention, offering a higher level of protection against side channel attacks.

FIG. 6 and FIG. 7 represent variants of the mechanism of FIG. 5.

FIG. 8 is a schematic illustration of a cryptographic device, for example, a smart card.

FIG. 9 is a block diagram illustrating programs that may be stored in the cryptographic device of FIG. 8.

DETAILED DESCRIPTION OF THE INVENTION

FIG. 1 describes an example of cryptographic mechanism consisting of a modular exponentiation. This sort of modular exponentiations is implemented in particular with RSA and Diffie Hellman algorithms.

As can be seen on step 2, for each bit $d_i$ of the exponent D, a modular squaring is performed (sub-step 2.*i*). When $d_i$ is equal to 1, a modular multiplication is performed (sub-step 2.*ii*).

D is usually derived from a random number. In general, the hamming weight of D is approximately n/2. Therefore, in general the method of FIG. 1 involves n modular squaring operations and around n/2 modular multiplications.

As known in the art, this type of cryptographic mechanisms is extremely sensitive even to the simplest side channel attacks such as SPA. Indeed, the power consumption is not the same during the execution of the multiplication operation and of the squaring operation. Therefore, one can put a probe on the cryptographic device implementing the cryptographic mechanism, measure the power consumption, and distinguish the multiplication and the squaring in the power trace, thereby identifying the value of all bits $d_i$. The exponent D is then recovered by the attacker.

FIG. 2 describes an example of cryptographic mechanism comprising a first level of protection against side channel attacks, known in the art as the "balanced modular exponentiation algorithm"

This method is similar to the one of FIG. 1, except that when $d_i$ is equal to 0, a third step iii is added, in which a dummy multiplication is executed. Thanks to this third step, the power consumption is very close whether the bit is equal to 0 or to 1.

The complexity of this method is increased since there are n multiplications and n square operations. However its resistance to basic side channel attacks is improved as well, as indicated above.

Unfortunately, this method remains very sensitive to another side channel attack known as the SE attack (safe error attack). Indeed, if the cryptographic mechanism is disrupted during a dummy multiplication, the multiplication fails, but the final result remains unaffected since the dummy multiplication is not used for the final result. Therefore an attacker can find out the dummy bits, which are bits equal to 0 in this example, and infer that all other bits are equal to 1, which results in the secret value of D being recovered.

FIG. 3 describes an example of known cryptographic mechanism comprising a second level of protection against side channel attacks, known in the art as "Joye & Al. modular exponentiation algorithm", and disclosed at CHES 2002 by Joye and Yen. It is based on the Montgomery Ladder algorithm.

The cryptographic mechanism of FIG. 3 aims at overcoming the limitation of the cryptographic mechanism of FIG. 2.

To this end, there is no more dummy operation. Instead, The result of all multiplications is used in the final result (except in the last round). Therefore disturbing the mechanism always leads to an erroneous output.

The complexity of this cryptographic mechanism is the same as the one of FIG. 2 (n multiplications, n square operations).

However, this cryptographic mechanism is still sensitive to DPA attacks. As known in the art, in a DPA attack, if the attacker is able to set the value of the input X, he can predict the value of the next intermediate value of steps i and ii by making assumptions on the values of $d_i$ and verifying them by studying correlations in the power consumption over a number of selected samples.

It is an object of the invention to improve known techniques such as the cryptographic mechanism of FIG. 3.

It would be possible to combine the teaching of FIG. 3 with a masking mechanism, as shown on FIG. 4. The masking may consist in multiplying the input element with a random number, thereby rendering the prediction step of the DPA attacks impossible. Unfortunately, the technique shown on FIG. 4 requires approximately 4*n operations, which makes it twice slower than previous techniques. The technique shown on FIG. 4 also performs the modular exponentiation twice. A first time for the masked input, and another time for the mask used for the masking. Due to this double modular exponentiation, the secret exponent D is used twice, which potentially weakens the mechanism.

A cryptographic mechanism according to the invention involves a secret D which can be represented as an n-bit number $\{d_0, d_1, \ldots d_{n-1}\}_2$. The cryptographic mechanism is arranged to calculate an output element OUT equal to $X^D$, X being an element of a monoid $\{M, *\}$. The mechanism comprises a first variable $VAR_0$ and a second variable $VAR_1$. The cryptographic mechanism comprises n steps $\{MUL_i\}_{i=n-1 \ldots 0}$ such that during each step $MUL_i$, the cryptographic device calculates $VAR_{1-di}*VAR_{di}$, and n other steps $\{SQ_i\}_{i=n-1 \ldots 0}$ such that during each step $SQ_i$, the cryptographic device calculates $VAR_{di}*VAR_{di}$. Each step $SQ_i$ is executed after the step $MUL_i$ for any i between 0 and n−1, and each step $MUL_{i-1}$ is executed after step $MUL_i$ for any i between 1 and n−1. The mechanism is characterized in that it comprises the steps of:

a. generating a random element MSK_INPUT,
b. creating a masked element MASKED_X by using the element X and the random element MSK_INPUT,
c. calculating a masked output element MASKED_OUT using the masked element MASKED_X, the calculation of the masked output element MASKED_OUT involving the abovementioned steps $\{MUL_i\}_{i=n-1 \ldots 0}$ and $\{SQ_i\}_{i=n-1 \ldots 0}$,
d. calculating an output mask MSK_OUTPUT from the random element MSK_INPUT without involving the secret D,
e. calculating the output element OUT using the masked output element MASKED_OUT and the output mask MSK_OUTPUT, wherein the step d occurs at any time between step a and step e, and wherein the steps a, b, c, e are consecutive.

As seen on FIG. 5, the computation of the output mask can take place together with the computation of the masked output element. As seen on FIG. 6, this computation can also take place serially (either after, as shown on step 4 of the figure, or before). It is also possible to perform this computation in parallel, for example inside two different threads, as depicted on FIG. 7 (C.F. steps 3*a* and 3*b*).

Thanks to the masking operation, the DPA attack is no longer applicable, as the attacker does not know the mask and does not have the possibility to make assumptions regarding the intermediate results.

The element X can be an input element supplied to the cryptographic mechanism by another mechanism, or can be generated inside the cryptographic mechanism. For example, in a cryptographic mechanism consisting of a timestamp mechanism, the current time may be determined securely inside the mechanism and then digitally signed inside the mechanism.

Similarly, the output element OUT can be communicated by the cryptographic mechanism to another mechanism, can be kept internally in the cryptographic mechanism, or can be post-processed in the cryptographic mechanism and sent to another mechanism in the post-processed form.

In preferred embodiments, the cryptographic mechanism according to the invention is such that the random element MSK_INPUT belongs to M* (the set of invertible elements of M, as seen above). If MSK_INPUT is equal to a value R, we denote by $R^{-1}$ the inverse of R for the operation * of the monoid {M, *}. With cryptographic mechanisms where the function f: MASKED_X→MASKED_OUT is such that there exists a function g such that f(R*X)=g(R)*f(X), one can apply a mask MSK_INPUT on the element X by multiplying X and R, and compute the output mask $(g(R))^{-1}$ to apply on the masked output in order to obtain the output element. In certain instances $(g(R))^{-1}$ may be equal to $g(R^{-1})$. In such embodiments, the inverse element $R^{-1}$ may therefore be used to compute the output mask MSK_OUTPUT.

Preferred cryptographic mechanisms according to the invention may be such that the calculation of the output mask MSK_OUTPUT comprises n steps $\{R\_SQ_i\}_{i=n-1 \ldots 0}$, such that during each step $R\_SQ_i$, the cryptographic device calculates $MSK_i*MSK_i$, $MSK_i$ being an element of the monoid {M, *}, the initial value $MSK_n$ being obtained from the inverse of the random number R, the last value $MSK_0$ being the output mask MSK_OUTPUT used to unmask the value of the masked output MASKED_OUT. This is advantageous in particular for mechanisms associated with a function g such that the computation of the function g may be executed by involving the steps $R\_SQ_i$.

More specifically, in a preferred mechanism according to the invention, $MSK_i$ may be equal to $MSK_{i+1}*MSK_{i+1}$ for i equal to n−1 down to 0. This is particularly advantageous for mechanisms associated with a function g: $MSK_n \to MSK_0$ where $MSK_i=MSK_i*MSK_{i+1}$ for i equal to n−1 down to 0.

In a preferred cryptographic mechanism, the masked element MASKED_X is equal to X*R and the output element OUT is equal to $MASKED\_OUT*MSK_0$, $MSK_n$ being equal to $R^{-1}$, the initial value of the first variable $VAR_0$ being set to the value R of the random element, the initial value of the second variable $VAR_1$ being set to the value of the masked element MASKED_X, each step $MUL_i$ consisting in calculating $VAR_{1-di}*VAR_{di}$ and storing the result in $VAR_{1-di}$, each step $SQ_i$ consisting in calculating $VAR_{di}*VAR_{di}$ and storing the result in $VAR_{di}$.

FIG. 5 describes an example of such preferred embodiment of the invention comprising:

1. a first step in which a random number is generated. This can be done for example by a hardware random number generator embedded in a cryptographic device implementing the cryptographic mechanism. Indeed, the random number is preferably as unpredictable as possible, which is best achieved with hardware means as known in the art;

2. a second step in which variables $VAR_0$, $VAR_1$ and $MSK_n$ are initialized;

3. a third step in which a masked output (value of $VAR_0$ after the last round of the loop) is calculated from the masked element, and an output mask $MSK_0$ is calculated;

4. a fourth step in which the masked output is unmasked with the output mask $MSK_0$ and is returned to the entity which invoked the cryptographic mechanism.

The cryptographic mechanism uses the element X and the secret D as inputs. In preferred embodiments, the secret D is stored securely and therefore does not need to be passed to the cryptographic mechanism each time the cryptographic mechanism is invoked. The element X is generally passed to the cryptographic mechanism as an input parameter, but may also be determined by the cryptographic mechanism itself (e.g. as seen above with time stamps based on a clock available in the cryptographic mechanism, etc.).

The invention also concerns a cryptographic device storing a secret D and implementing a cryptographic mechanism as described above. The invention concerns more particularly cryptographic devices of the smart card type.

The invention is particularly advantageous for embedded systems such as smart cards as it has very few additional requirements compared to state of the art cryptographic mechanisms. It is well suited to the RSA algorithm. Indeed, it does not require any additional information on the key material compared to traditional cryptographic mechanisms. In particular, it does not require the public exponent of the RSA key pair to be available to the cryptographic mechanism.

It is similarly advantageous for the Diffie Hellman algorithm, as it does not require any extra parameter, and is therefore very convenient in particular for establishing session keys in static mode.

It is also advantageous for both above algorithms in that it does not require an additive mask on the exponent, nor on the element X, which would require a more powerful processor (or crypto processor in case the cryptographic algorithms are implemented partially or fully in hardware).

The complexity of the preferred embodiment of FIG. 5 involves approximately 2*n square operations and n multiplications, i.e. around 3*n CPU intensive operations, which is only 50% more than the closest method (Montgomery ladder of FIG. 3), and does not require much more RAM (50% at most).

It should be noted that for some random elements used as input masks, the steps $SQ\_RD_i$ may lead (for a certain value i_weak of the index i) to $MSK_{i\_weak}=1$, in which case all subsequent values ($MSK_{i\_weak-1}$, $MSK_{i\_weak-2}$, etc.) are equal to 1 as well. This situation corresponds to a weak output mask, since it is equivalent to not having an output mask (the masked output and the output are equal). However, this weakness is hard to exploit, and is very unlikely to happen. The probability of a random element leading to a weak mask is very low. For example, it is estimated that for RSA 2048, the probability of picking a weak random element is at most equal to $1.9*10^{-7}$. The probability depends on the value of the RSA key, and in practice it is often much lower than the above value. The probability can be made arbitrarily small by picking several invertible random elements and multiplying them together (only if all elements are weak will the product of the elements be weak).

FIG. 8 is a schematic illustration of a cryptographic device 109, for example, a smart card. The cryptographic device 109 may include a processor 201 connected via a bus 202 to a random access memory (RAM) 203, a read-only memory (ROM) 204, and a non-volatile memory (NVM) 205. The cryptographic device 109 further includes an input/output interface 207 for connecting the processor 201, again typically via the bus 202, to a connector 211 by which the portable security device 109 may be connected to the host computer 103. The connector 211 may include power connections.

The NVM 205 and/or ROM 204 may include computer programs 301 as is illustrated in FIG. 9. While it is here depicted that the computer programs 301 are all co-located in the ROM 202 or the NVM 205, in actual practice there is no such restriction as programs may be spread out over multiple memories and even temporarily installed in RAM 203. Furthermore, the cryptographic device 109 may include multiple ROMs or NVMs. The programs 301 include operating system programs as well as application programs loaded on to the cryptographic device 109. The NVM 205 or ROM 202 may also contain private data, such as a private key 209 or a shared secret key 210, stored either in its basic form or in derived quantities.

The cryptographic device 109 programs 301 may include a cryptography module 213, other programs 215, 217, and the operating system OS 219. The cryptography module, for example, may implement the cryptographic mechanisms described herein.

The invention claimed is:

1. A cryptographic mechanism involving a secret D which can be represented as an n-bit number $\{d_0, d_1, \ldots d_{n-1}\}_2$, the cryptographic mechanism being arranged to calculate an output element OUT equal to $X^D$, X being an element of a monoid $\{M, *\}$, the cryptographic mechanism comprising a first variable $VAR_0$, a second variable $VAR_1$, and computer program instructions to cause a processor of a cryptographic device to perform the steps of:
   a. generating a random element MSK_INPUT (R);
   b. creating a masked element MASKED_X (VAR1) by using the element X and the random element MSK_INPUT and initializing a masked output element to the random element MSK_INPUT (R);
   c. calculating the masked output element MASKED_OUT (VAR0) using the masked element MASKED_X (VAR1), the calculation of the masked output element MASKED_OUT thereby accumulating the random element MSK_INPUT (R) into intermediate results for MASKED_X and MASKED_OUT, the calculation comprising:
      for i=n-1 down to 0:
      performing a step MULi: $VAR_{1-d_i} \rightarrow VAR_{1-d_i} * VAR_{d_i}$;
      performing a step SQi: $VAR_{d_i} \rightarrow VAR_{d_i} * VAR_{d_i}$;
   d. calculating an output mask MSK_OUTPUT ($MSK_0$) from the random element MSK_INPUT, MSK_OUTPUT ($MSK_0$) being an inverse of the accumulation of the random element MSK_INPUT in masked output element MASKED_OUT during the step of calculating the masked output element in step c, without involving the secret D;
   e. calculating the output element OUT using the masked output element MASKED_OUT and the output mask MSK_OUTPUT; and
   wherein the step d occurs at any time between step a and step e, and wherein the steps a, b, c and e are consecutive.

2. The cryptographic mechanism according to claim 1, wherein the random element MSK_INPUT (R) has an inverse element ($R^{-1}$) for the operation * of the monoid $\{M, *\}$, the inverse element being usable to compute the output mask MSK_OUTPUT.

3. The cryptographic mechanism according to claim 2 wherein the calculation of the output mask MSK_OUTPUT comprises n steps $\{R\_SQ_i\}_{i=n-1 \ldots 0}$, such that during each step $R\_SQ_i$, the cryptographic device calculates $MSK_i * MSK_i$, $MSK_i$ being an element of the monoid $\{M, *\}$, the initial value $MSK_n$ being obtained from the inverse element ($R^{-1}$) of the random element MSK_INPUT, the last value $MSK_0$ being the output mask MSK_OUTPUT used to unmask the value of the masked output MASKED_OUT.

4. The cryptographic mechanism according to claim 3, wherein $MSK_i$ is equal to $MSK_{i+1} * MSK_{i+1}$ for i equal to n-1 down to 0.

5. The cryptographic mechanism according to claim 4, wherein the masked element MASKED_X is equal to X*R and wherein the output element OUT is equal to MASKED_OUT*$MSK_0$, $MSK_n$ being equal to the inverse of R, the initial value of the first variable $VAR_0$ being set to the value (R) of the random element, the initial value of the second variable $VAR_1$ being set to the value of the masked element MASKED_X, each step $MUL_i$ consisting in calculating $VAR_{1-d_i} * VAR_{d_i}$ and storing the result in $VAR_{1-d_i}$, each step $SQ_i$ consisting in calculating $VAR_{d_i} * VAR_{d_i}$ and storing the result in $VAR_{d_i}$.

6. A cryptographic device having a processor, a memory storing a secret D which can be represented as an n-bit number $\{d_0, d_1, \ldots d_{n-1}\}_2$, and a cryptographic mechanism being arranged to calculate an output element OUT equal to $X^D$, X being an element of a monoid $\{M, *\}$, the cryptographic mechanism comprising a first variable $VAR_0$ and a second variable $VAR_1$, and the cryptographic mechanism causing the processor of the cryptographic device to execute the steps of:
   a. generating a random element MSK_INPUT (R);
   b. creating a masked element MASKED_X (VAR1) by using the element X and the random element MSK_INPUT and initializing a masked output element to the random element MSK_INPUT (R);
   c. calculating the masked output element MASKED_OUT (VAR0) using the masked element MASKED_X, the calculation of the masked output element MASKED_OUT thereby accumulating the random element MSK_INPUT (R) into intermediate results for MASKED_X and MASKED_OUT, the calculation comprising:
      for i=n-1 down to 0:
      performing a step MULi: $VAR_{1-d_i} \rightarrow VAR_{1-d_i} * VAR_{d_i}$;
      performing a step SQi: $VAR_{d_i} \rightarrow VAR_{d_i} * VAR_{d_i}$;
   d. calculating an output mask MSK_OUTPUT (MSK0) from the random element MSK_INPUT, MSK_OUTPUT ($MSK_0$) being an inverse of the accumulation of the random element MSK_INPUT in masked output element MASKED_OUT during the step of calculating the masked output element in step c, without involving the secret D;
   e. calculating the output element OUT using the masked output element MASKED_OUT and the output mask MSK_OUTPUT; and
   wherein the step d occurs at any time between step a and step e, and wherein the steps a, b, c and e are consecutive.

7. A smart card having a processor, a memory storing a secret D which can be represented as an n-bit number $\{d_0, d_1, \ldots d_{n-1}\}_2$, and a cryptographic mechanism being arranged to calculate an output element OUT equal to $X^D$, X being an element of a monoid $\{M, *\}$, the cryptographic mechanism comprising a first variable $VAR_0$, a second variable $VAR_1$, and instructions to cause the processor of the smart card to execute the steps of:
   a. generating a random element MSK_INPUT (R);
   b. creating a masked element MASKED_X ($VAR_1$) by using the element X and the random element MSK_IN- PUT and initializing a masked output element to the random element MSK_INPUT (R);

c. calculating the masked output element MASKED_OUT (VAR$_0$) using the masked element MASKED_X, the calculation of the masked output element MASKED_OUT thereby accumulating the random element MSK_INPUT (R) into intermediate results for MASKED_X and MASKED_OUT, the calculation comprising:

for i=n−1 down to 0:
performing a step MULi: VAR$_{1-di}$→VAR$_{1-di}$*VAR$_{di}$;
performing a step SQi: VAR$_{di}$→VAR$_{di}$*VAR$_{di}$;

d. calculating an output mask MSK_OUTPUT (MSK$_0$) from the random element MSK_INPUT, MSK_OUTPUT (MSK$_0$) being an inverse of the accumulation of the random element MSK_INPUT in masked output element MASKED_OUT during the step of calculating the masked output element in step c, without involving the secret D;

e. calculating the output element OUT using the masked output element MASKED_OUT and the output mask MSK_OUTPUT; and wherein the step d occurs at any time between step a and step e, and wherein the steps a, b, c and e are consecutive.

8. The cryptographic device of claim 6 wherein the cryptographic mechanism further comprises the random element MSK_INPUT (R) has an inverse element (R$^{-1}$) for the operation * of the monoid {M, *}, the inverse element being usable to compute the output mask MSK_OUTPUT.

9. The cryptographic device of claim 8 wherein the cryptographic mechanism further comprises the calculation of the output mask MSK_OUTPUT comprising n steps {R_SQ$_i$}$_{i=n-1 \ldots 0}$, such that during each step R_SQ$_i$, the cryptographic device calculates MSK$_i$*MSK$_i$, MSK$_i$ being an element of the monoid {M, *}, the initial value MSK$_n$ being obtained from the inverse element (R$^{-1}$) of the random element MSK_INPUT, the last value MSK$_0$ being the output mask MSK_OUTPUT used to unmask the value of the masked output MASKED_OUT.

10. The cryptographic device of claim 9 wherein the MSK$_i$ is equal to MSK$_{i+1}$*MSK$_{i+1}$ for i equal to n−1 down to 0.

11. The cryptographic device of claim 10 wherein the masked element MASKED_X is equal to X*R and wherein the output element OUT is equal to MASKED_OUT*MSK$_0$, MSK$_n$ being equal to the inverse of R, the initial value of the first variable VAR$_0$ being set to the value (R) of the random element, the initial value of the second variable VAR$_1$ being set to the value of the masked element MASKED_X, each step MUL$_i$ consisting in calculating VAR$_{1-di}$*VAR$_{di}$ and storing the result in VAR$_{1-di}$, each step SQ$_i$ consisting in calculating VAR$_{di}$*VAR$_{di}$ and storing the result in VAR$_{di}$.

12. The smart card of claim 7 wherein the random element MSK_INPUT (R) has an inverse element (R$^{-1}$) for the operation * of the monoid {M, *}, the inverse element being usable to compute the output mask MSK_OUTPUT.

13. The smart card of claim 12, wherein the calculation of the output mask MSK_OUTPUT comprises n steps {R_SQ$_i$}$_{i=n-1 \ldots 0}$, such that during each step R_SQ$_i$, the cryptographic device calculates MSK$_i$*MSK$_i$, MSK$_i$ being an element of the monoid {M, *}, the initial value MSK$_n$ being obtained from the inverse element (R$^{-1}$) of the random element MSK_INPUT, the last value MSK$_0$ being the output mask MSK_OUTPUT used to unmask the value of the masked output MASKED_OUT.

14. The smart card of claim 13, wherein MSK$_i$ is equal to MSK$_{i+1}$*MSK$_{i+1}$ for i equal to n−1 down to 0.

15. The smart card of claim 14, wherein the masked element MASKED_X is equal to X*R and wherein the output element OUT is equal to MASKED_OUT*MSK$_0$, MSK$_n$ being equal to the inverse of R, the initial value of the first variable VAR$_0$ being set to the value (R) of the random element, the initial value of the second variable VAR$_1$ being set to the value of the masked element MASKED_X, each step MUL$_i$ consisting in calculating VAR$_{1-di}$*VAR$_{di}$ and storing the result in VAR$_{1-di}$, each step SQ$_i$ consisting in calculating VAR$_{di}$*VAR$_{di}$ and storing the result in VAR$_{di}$.

16. A cryptographic mechanism for masking a cryptographic operation to calculate a final result as a function of a value X and a multi-bit secret D composed of n bits d$_i$, such that the cryptographic operation is masked in a manner to reduce risk of side-channel attack on the cryptographic operation, the cryptographic mechanism comprising instructions to cause a processor of a cryptographic device to perform the steps of:

iterating over the bits d$_i$, and for each iteration:
computing a zeroth intermediate result corresponding to the contribution to the final result of the i-th bit of D;
computing a first intermediate result that may be used to calculate the zeroth intermediate result of a subsequent iteration;
accumulating an evolving mask in the zeroth and first intermediate results; and
whereby the accumulated evolved mask is a function of the number of bits in D;

calculating an inverse of the accumulation of the mask; and recovering the value final result by applying the calculated inverse of the accumulation of the mask to the zeroth intermediate result.

17. The cryptographic mechanism of claim 16 wherein the cryptographic operation is an exponentiation of a value X by the value D thereby computing the final result X$^D$.

18. The cryptographic mechanism of claim 16 further comprising instructions to cause the processor to perform the steps of initializing the zeroth intermediate result to a random value R;

initializing the first intermediate result to a function of the random value R and the value X;

initializing an inverse mask to the inverse of the random value R;

wherein the step of iterating over the bits d$_i$ operates from i=n−1 down to 0, and each iteration comprises:

if d$_i$ is 0:
setting the first intermediate result to the first intermediate result times the zeroth intermediate result;
setting the zeroth intermediate result to the zeroth intermediate result squared if d$_i$ is 1:
setting the zeroth intermediate result to the first intermediate result times the zeroth intermediate result;
setting the first intermediate result to the first intermediate result squared; and setting the inverse mask to the inverse mask squared thereby iteratively calculating the inverse of the accumulation of the mask; and wherein the step of recovering the final result X$^D$ comprises multiplying the zeroth intermediate result and the inverse mask.

19. The cryptographic mechanism of claim 17 further comprising instructions to cause the processor to perform the steps of
    initializing the zeroth intermediate result to a random value R;
    initializing the first intermediate result to a function of the random value R and the value X;
    initializing an inverse mask to the inverse of the random value R;
    wherein the step of iterating over the bits $d_i$ operates from i=n−1 down to 0, and each iteration comprises:
        if $d_i$ is 0:
            setting the first intermediate result to the first intermediate result times the zeroth intermediate result;
            setting the zeroth intermediate result to the zeroth intermediate result squared
        if $d_i$ is 1:
            setting the zeroth intermediate result to the first intermediate result times the zeroth intermediate result;
            setting the first intermediate result to the first intermediate result squared; and
    setting the inverse mask to the inverse mask squared thereby iteratively calculating the inverse of the accumulation of the mask; and
    wherein the step of recovering the final result $X^D$ comprises multiplying the zeroth intermediate result and the inverse mask.

\* \* \* \* \*